United States Patent [19]

Harrison et al.

[11] Patent Number: 5,252,198
[45] Date of Patent: Oct. 12, 1993

[54] MULTI-STEP HYDRODESULPHURISATION PROCESS

[75] Inventors: George E. Harrison, Billericay; Donald H. McKinley, Radlett; Alan J. Dennis, Acklam, all of United Kingdom

[73] Assignee: Davy McKee (London) Ltd., London, England

[21] Appl. No.: 781,172

[22] PCT Filed: May 9, 1990

[86] PCT No.: PCT/GB90/00717

§ 371 Date: Dec. 11, 1991

§ 102(e) Date: Dec. 11, 1991

[87] PCT Pub. No.: WO90/13612

PCT Pub. Date: Nov. 15, 1990

[30] Foreign Application Priority Data

May 10, 1989 [GB] United Kingdom ............... 8910712

[51] Int. Cl.$^5$ .................. C10G 45/00; C10G 45/04
[52] U.S. Cl. ................... 208/208 R; 208/209; 208/210; 208/213
[58] Field of Search .............. 208/208 R, 209, 210, 208/213

[56] References Cited

U.S. PATENT DOCUMENTS

| | | | |
|---|---|---|---|
| 3,091,586 | 5/1963 | Pappas et al. | 208/210 |
| 3,425,810 | 5/1965 | Scott, Jr. | 23/289 |
| 4,051,020 | 9/1977 | McDonald | 208/213 |
| 4,243,519 | 1/1981 | Schorfheide | 208/210 |

FOREIGN PATENT DOCUMENTS

| | | | |
|---|---|---|---|
| 7005317 | 12/1977 | Japan | 208/213 |
| 7005318 | 12/1977 | Japan | 208/213 |
| 2005151 | 4/1973 | United Kingdom | |

OTHER PUBLICATIONS

*Perry's Chemical Engineers' Handbook*, Sixth edition, pp. 7-26 and 7-27 no date.

Primary Examiner—Theodore Morris
Assistant Examiner—Zeinab El Arini
Attorney, Agent, or Firm—Rothwell, Figg, Ernst & Kurz

[57] ABSTRACT

A hydrodesulfurization process is provided for continuously effecting hydrodesulfurization of a liquid sulfur-containing hydrocarbon feedstock which comprises: (a) providing a hydrodesulfurization zone maintained under hydrodesulfurization conditions and comprising a column reactor having a plurality of reaction trays therein mounted one above another, each tray defining a respective reaction stage adapted to hold a predetermined liquid volume and a charge of a sulfided solid hydrodesulfurization catalyst therein, liquid downcomer means associated with each reaction tray adapted to allow liquid to pass down the column reactor from that tray but to retain solid catalyst thereon, and gas upcomer means associated with each reaction tray adapted to allow gas to enter that tray from below and to agitate the mixture of liquid and catalyst on that tray; (b) supplying liquid sulfur-containing hydrocarbon feedstock to the uppermost one of said plurality of reaction trays; (c) supplying hydrogen-containing gas below the lowermost one of said plurality of reaction trays; (d) allowing liquid to pass downward through the column reactor from tray to tray; (e) allowing hydrogen-containing gas to pass upward through the column reactor from tray to tray; (f) recovering from the uppermost one of said plurality of reaction trays and off-gas containing hydrogen sulfide produced by hydrodesulfurization; and (g) recovering from the lowermost one of said plurality of reaction trays a liquid hydrocarbon product of reduced sulfur content.

6 Claims, 5 Drawing Sheets

MULTI-STEP HYDRODESULPHURISATION PROCESS

FIELD OF THE INVENTION

This invention relates to a process for hydrodesulphurisation of a hydrocarbon feedstock.

DESCRIPTION OF BACKGROUND ART

Crude oils, their straight-run and cracked fractions and other petroleum products contain sulphur in varying amounts, depending upon the source of the crude oil and any subsequent treatment that it may have undergone. Besides elemental sulphur, numerous sulphur compounds have been identified in crude oil including hydrogen sulphide ($H_2S$), $C_1$ to $C_5$ primary alkyl mercaptans, $C_3$ to $C_8$ secondary alkyl mercaptans, $C_4$ to $C_6$ tertiary alkyl mercaptans, cyclic mercaptans (such as cyclopentane thiol, cyclohexane thiol and cis-2-methylcyclopentane thiol), open chain sulphides of the formula R-S-R' where R and R' represent $C_1$ to $C_4$ alkyl groups, mono-, bi- and tri-cyclic sulphides, thiophene, alkyl substituted thiophenes, condensed thiophenes (such as benzo(b)thiophene, isothionaphthene, dibenzothiophene, and benzo(b)naphtho(2,1-d)thiophene), thienothiophenes, alkyl cycloalkyl sulphides, alkyl aryl sulphides, 1-thiaindans, aromatic thiols (such as thiophenol), and cyclic thiols such as cyclohexane thiol.

SUMMARY OF THE INVENTION

Generally speaking, low API gravity crude oils usually contain more sulphur than high API gravity crude oils, although there are some exceptions. Moreover the distribution of sulphur compounds in the different fractions of petroleum varies mainly with the boiling range of the fractions. Thus the lighter fractions such as naphtha contain fewer sulphur compounds, whilst the content of sulphur compounds also increases as the boiling point or API density or molecular weight of the fraction increases. Most of the sulphur compounds that have been positively identified as components of crude oil boil below about 200° C. Many other sulphur compounds of high molecular weight and high boiling point remain unidentified in crude oil.

For a variety of reasons it is necessary to treat crude oil and petroleum fractions derived therefrom to remove the sulphur components present therein. Otherwise subsequent processing may be hindered, for example because the sulphur components may adversely affect the performance of a catalyst. If the hydrocarbon fraction is intended for fuel use, then burning of the fuel will result in any sulphur components present therein being converted to sulphur oxides which are environmentally damaging.

For these reasons it is necessary to remove as far as possible the sulphur content from hydrocarbon fractions derived from crude oil, such as gasoline fractions, diesel fuel, gas oils and the like. Typically such sulphur removal is carried out by a process known generally as hydrodesulphurisation. In such a process the hydrocarbon fraction is admixed with hydrogen and passed over a hydrodesulphurisation catalyst under appropriate temperature and pressure conditions. In such a process the aim is to rupture the carbon-sulphur bonds present in the feedstock and to saturate with hydrogen the resulting free valencies or olefinic double bonds formed in such a cleavage step. In this process the aim is to convert as much as possible of the organic sulphur content to hydrocarbons and to $H_2S$. Typical equations for major types of sulphur compounds to be hydrodesulphurised are shown below:

1. Thiols:

2. Disulphides:

3. Sulphides:
   a. Open chain b. Cyclic c. Bicylcic:

4. Thiophenes:

5. Benzothiophenes:

6. Dibenzothiophenes:

Generally the cyclic sulphur-containing compounds are harder to hydrogenate than the open chain compounds and, within the class of cyclic sulphur-containing compounds, the greater the number of rings that are present the greater is the difficulty in cleaving the carbon-sulphur bonds.

Besides the presence of sulphur oxides in the combustion gases from hydrocarbon fuels, other environmentally undesirable components of such combustion gases typically include aromatic hydrocarbons, which may be present because of incomplete combustion, and carbonaceous particulate matter often containing polycyclic aromatic hydrocarbons, metal compounds, oxygenated organic materials, and other potentially toxic materials.

Because of present concerns about pollution, increasingly stringent limits are being placed by various national legislations around the world upon the levels of permitted impurities in hydrocarbon fuels, such as diesel fuel. In particular the United States Environmental Protection Agency has recently proposed rules which would limit the sulphur content to 0.05 wt % and the aromatics content to 20 volume % in highway diesel fuels (see, for example, the article "Higher Diesel Quality Would Constrict Refining" by George H. Unzelman, Oil and Gas Journal, Jun. 19, 1987, pages 55 to 59). Such rules require refiners to face additional diesel treating requirements and increased investment and operating costs. Additional reductions in the permitted levels of sulphur content and aromatics content at some future date cannot be ruled out.

When a hydrocarbon feedstock is treated with hydrogen in the presence of a suitable catalyst with the aim of effecting hydrodesulphurisation, other reactions may also occur. Hence hydrotreating is often used as a more general term to embrace not only the hydrodesulphurisation reactions but also the other reactions that occur, including hydrocracking, hydrogenation and other hydrogenolysis reactions. The term "hydrotreating" is further explained in an article "Here is a nomenclature-system proposed for hydroprocessing", The Oil and Gas Journal, Oct. 7, 1968, pages 174 to 175.

There are four main hydrogenolysis reactions, of which hydrodesulphurisation (HDS) is probably the most important, followed by hydrodenitrogenation (HDN), hydrodeoxygenation (HDO), and hydrodemetallation (HDM). Amongst catalysts which have been proposed for such hydrotreating reactions are molybdenum disulphide, tungsten sulphide, sulphided nickel-molybdate catalysts (NiMoS$_x$), and cobalt-molybdenum alumina sulphide (Co-Mo/alumina).

Although the prior art regards the simultaneous occurrence of some hydrogenation reactions, such as hydrogenation of olefins and aromatic hydrocarbons, as not being advantageous in a hydrodesulphurisation process because the aromatic content of the product was within the required specification and because the use of valuable hydrogen for unnecessary hydrogenation reactions was deemed disadvantageous, there is a growing storage of light crude oil. Thus the present and future trend towards the use of middle distillates and heavier petroleum fractions, coupled with increasingly stringent specifications, means that aromatic hydrogenation will be an increasingly necessary component of refinery operations. Hence, under current conditions and increasingly for the future, it will be desirable to combine hydrodesulphurisation and aromatic hydrogenation.

In contrast, except when processing high molecular weight residues, extensive hydrocracking reactions are to be avoided in most refinery hydrotreating operations as far as possible because they are highly exothermic and can cause thermal damage to catalysts and reaction vessels, as well as leading to the deposition of carbonaceous materials causing loss of catalyst activity. Thus an operator of a hydrodesulphurisation plant has reported in an article "Refiners seek improved hydrogen production", Oil & Gas Journal, Jul. 20, 1987, pages 48 and 49, that reactors in service have overheated severely, one to the point of rupture, due to unwanted hydrocracking reactions occurring.

The danger of such hydrocracking reactions occurring can be minimised by ensuring that the catalyst remains adequately sulphided.

A number of papers have appeared in the literature relating to hydrodesulphurisation technology, including:

(a) "Kinetics of Thiophene Hydrogenolysis on a Cobalt Molybdate Catalyst", by Charles N. Satterfield et al, AICHE Journal, Vol. 14, No. 1 (January 1968), pages 159 to 164;

(b) "Hydrogenation of Aromatic Hydrocarbons Catalysed by Sulfided $CoO-MoO_3$/gamma-$Al_2O_3$. Reactivities and Reaction Networks" by Ajit V. Sapre et al, Ind. Eng. Chem. Process Des. Dev, Vol. 20, No. 1, 1981, pages 68 to 73;

(c) "Hydrogenation of Biphenyl Catalyzed by Sulfided $CoO-MoO_3$/gamma-$Al_2O_3$. The Reaction Kinetics", by Ajit V. Sapre et al, Ind. Eng. Chem. Process Des. Dev, Vol. 21, No. 1, 1982, pages 86 to 94;

(d) "Hydrogenolysis and Hydrogenation of Dibenzothiophene Catalyzed by Sulfided $CoO-MoO_3$/gamma-$Al_2O_3$: The Reaction Kinetics" by D. H. Broderick et al, AIChE Journal, Vol. 27, No. 4, July 1981, pages 663 to 672; and (e) "Hydrogenation of Aromatic Compounds Catalyzed by Sulfided $CoO-MoO_3$/gamma-$Al_2O_3$" by D. H. Broderick et al, Journal of Catalysis, Vol. 73, 1982, pages 45 to 49.

A review of the reactivity of hydrogen in sulphide catalysts, such as those used as hydrotreating catalysts, appears on pages 584 to 607 of the book "Hydrogen Effects of Catalysis" by Richard B. Moyes, published by Marcel Dekker, Inc. (1988).

A review of industrially practised hydrotreating processes is published each year in the Journal "Hydrocarbon Processing", normally in the September issue. For example reference may be made to "Hydrocarbon Processing", September 1984, page 70 et seq and to "Hydrocarbon Processing", September 1988, pages 61 to 91.

An outline of three prior art hydrotreating processes appears in "Hydrocarbon Processing 1988 Refining Handbook" on pages 78 and 79 of "Hydrocarbon Processing", September 1988. In the "Chevron RDS/VRDS Hydrotreating Process" a mixture of fresh liquid hydrocarbon feedstock, make-up hydrogen and recycled hydrogen is fed to a reactor in a "once-through" operation. As illustrated the reactor has three beds and inter-bed cooling is provided by injection of further amounts of recycle hydrogen. The recycle hydrogen is passed through an $H_2S$ scrubber. In the "HY-VAHL Process" a once-through operation for the liquid feed is also used. Again, amine scrubbing is used to remove $H_2S$ from the recycle hydrogen. The Unionfining Process also utilises a once-through basis for the liquid feed. Cocurrent hydrogen and liquid flow is envisaged. Unreacted hydrogen is recycled.

In all three processes gas recycle is used to cool the catalyst bed and so minimise the risk of thermal runaways occurring as a result of significant amounts of hydrocracking taking place. Use of gas recycle means that inert gases tend to accumulate in the circulating gas which in turn means that, in order to maintain the desired hydrogen partial pressure, the overall operating pressure must be raised to accommodate the circulating inert gases and that the size and cost of the gas recycle compressor must be increased and increased operating costs must be tolerated.

Use of a trickle technique is described in an article "New Shell Hydrodesulphurisation Process Shows These Features", Petroleum Refiner, Vol. 32, No. 5 (May 1953), on page 137 et seq. FIG. 1 of this article illustrates a reactor with four catalyst beds with introduction of a mixture of hot gas and gas oil at the inlet end of the first bed and use of cold shots of gas oil between subsequent beds.

In these hydrodesulphurisation processes the conditions at the inlet end of the catalyst bed are critically important because this is where the risk of hydrocracking is greatest, especially if the level of sulphurisation of the catalyst should drop. This can occur, for example, if a low sulphur feedstock is fed to the plant or if a feedstock is used in which the sulphurous impurities are predominantly polycyclic compounds.

Hydrorefining of a naphtha feedstock is described in U.S. Pat. No. 4,243,519. This appears to involve a substantially wholly vapour phase process.

Multiple stage hydrodesulphurisation of residuum with movement of catalyst between stages in the opposite direction to movement of gas and liquid is described in U.S. Pat. No. 3,809,644.

U.S. Pat. No. 3,847,799 describes conversion of black oil to low-sulphur fuel oil in two reactors. Make-up hydrogen is supplied to the second reactor but in admixture with hydrogen exiting the first reactor that has been purified by removal of hydrogen sulphide therefrom. Hence hydrogen is recovered from the first reactor and recycled to the second reactor in admixture with inert gases-which will accordingly tend to accumulate in the gas recycle loop. Any condensate obtained from the first reactor is admixed with product from the second reactor.

In a hydrodesulphurisation plant with a gas recycle regime some of the $H_2S$ produced, normally a minor part thereof, will remain in the liquid phase after product separation whilst the remainder, normally a major part thereof, of the $H_2S$ will remain in the gas phase. Even in plants in which interbed cooling with "cold shots" of recycle gas is practised the $H_2S$ released remains in the gas/liquid mixture as this passes through the catalyst bed. Hence the $H_2S$ partial pressure is-usually highest at the exit end of the catalyst bed or of the final bed, if more than one bed is used. As the catalyst activity for hydrodesulphurisation is decreased by raising the $H_2S$ partial pressure, the catalyst activity is lowest at the exit end from the bed-which is where the highest activity is really needed if the least tractable polycyclic organic sulphurous compounds are to undergo hydrodesulphurisation.

The catalysts used for hydrodesulphurisation are usually also capable of effecting hydrogenation of aromatic compounds, provided that the sulphur level is low. The conditions required for carrying out hydrogenation of aromatic compounds are generally similar to those required for hydrodesulphurisation. However, as the reaction is an equilibrium that is not favoured by use of high temperatures, the conditions required for dehydrosulphurisation of cyclic and polycyclic organic sulphur compounds in a conventional plant do not favour hydrogenation of aromatic compounds. Moreover as the design of conventional hydrodesulphurisation plants results in high partial pressures of $H_2S$ at the downstream end of the plant the catalyst activity is correspondingly reduced and the conditions do not lead to significant reduction in the aromatic content of the feedstock being treated. Hence in an article entitled "Panel gives hydrotreating guides", Hydrocarbon Processing, March 1989, pages 113 to 116, it is stated at page 114:

"It is a fundamental kinetic fact that at pressures for normal middle distillate desulfurizers (500 to 800 psig) it is difficult to obtain appreciable aromatic saturation. Thus, if the feedstock is far above the 20% aromatics level, there is not much you can do with typical hydrotreaters, with any catalysts that we have knowledge of, to significantly reduce aromatics.
You are then left with the unpalatable alternatives of higher pressure units, aromatic extraction, and all the other alternatives."

Removal of $H_2S$ from a hydrodesulphurisation plant with a gas recycle system is normally effected by scrubbing the recycle gas with an amine. As the scrubber section has to be sufficiently large to cope with the highest levels of sulphurous impurities likely to be present in the feedstocks to be treated, the scrubber equipment has to be designed with an appropriate capacity, even though the plant will often be operated with low sulphur feedstocks. The capital cost of such scrubber equipment is significant.

It would be desirable to provide a more efficient process for effecting hydrodesulphurisation of liquid hydrocarbon feedstocks, in particular one in which the danger of hydrocracking reactions occurring is substantially obviated. It would further be desirable to provide a hydrodesulphurisation process in which the activity of the catalyst is controlled throughout the reactor in such a way that improved levels of hydrodesulphurisation can be achieved at a given operating pressure than can be achieved in a conventional process. It would also be desirable to provide a hydrodesulphurisation process which permits operation in such a way as to achieve a simultaneous significant reduction in the aromatics content of the feedstock being treated, particularly those feedstocks in which the aromatics content exceeds about 20%.

The invention accordingly seeks to provide a process in which hydrodesulphurisation can be conducted more efficiently than in a conventional hydrodesulphurisation process. It also seeks to provide a hydrodesulphurisation process in which the activity of the catalyst is controlled favourably throughout the reactor to enable improved levels of hydrodesulphurisation of the feedstock to be achieved. It further seeks to provide a hydrodesulphurisation process which enables also a significant reduction in the aromatics content of the feedstock to be effected simultaneously with hydrodesulphurisation.

DETAILED DESCRIPTION OF PREFERRED EMBODIMENTS

According to the present invention there is provided a hydrodesulphurisation process for continuously effecting hydrodesulphurisation of a liquid sulphur-containing hydrocarbon feedstock which comprises:

(a) providing a hydrodesulphurisation zone maintained under hydrodesulphurisation conditions and comprising a column reactor having a plurality of reaction trays therein mounted one above another, each tray defining a respective reaction stage adapted to hold a predetermined liquid volume and a charge of a particulate sulphided solid hydrodesulphurisation catalyst suspended therein, and each reaction tray having a floor at least a part of which slopes at an angle equal to or greater than the angle of repose of the catalyst particles under the liquid, said column reactor further comprising liquid downcomer means associated with each reaction tray adapted to allow liquid to pass down the column reactor from that tray but to retain solid catalyst thereon, and gas upcomer means associated with each reaction tray adapted to allow gas to enter that tray from below and to agitate the mixture of liquid and catalyst on that tray;

(b) supplying liquid sulphur-containing hydrocarbon feedstock to the uppermost one of said plurality of reaction trays;

(c) supplying hydrogen-containing gas below the lowermost one of said plurality of reaction trays;

(d) allowing liquid to pass downward through the column reactor from tray to tray;

(e) allowing hydrogen-containing gas to pass upward through the column reactor from tray to tray;

(f) recovering from the uppermost one of said plurality of reaction trays an off-gas containing $H_2S$ produced by hydrodesulphurisation; and (g) recovering from the lowermost one of said plurality of reaction trays a liquid hydrocarbon product of reduced sulphur content.

Normally the gas entering the uppermost tray contains sufficient $H_2S$ and/or the liquid feedstock contains sufficient sulphur-containing material selected from $H_2S$ and active sulphur-containing materials to maintain the catalyst charge thereon in sulphided form.

By the term active sulphur-containing materials there is meant materials which very rapidly form $H_2S$ under hydrodesulphurisation conditions in the presence of a hydrodesulphurisation catalyst. Examples of such materials include, for example, $CS_2$, COS, alkyl mercaptans, dialkyl sulphides, and dialkyl disulphides.

The solid sulphided catalyst used in the process of the present invention is preferably selected from molybdenum disulphide, tungsten sulphide, cobalt sulphide, nickel/tungsten sulphide, cobalt/tungsten sulphide, sulphided nickel-molybdate catalysts ($NiMoS_x$), a sulphided $CoO-MoO_3/gamma-Al_2O_3$ catalyst, and mixtures thereof.

Typical hydrodesulphurisation conditions include use of a pressure in the range of from about 20 bar to about 150 bar and of a temperature in the range of from about 240° C. to about 400° C. Preferred conditions include use of a pressure of from about 25 bar to about 100 bar and of a temperature of from about 250° C. to about 370° C.

The liquid sulphur-containing hydrocarbon feedstock may comprise a mixture of saturated hydrocarbons, such as n-paraffins, iso-paraffins, and naphthenes, in varying proportions. It may further comprise one or more aromatic hydrocarbons in amounts of, for example, from about 1 volume % up to about 30 volume % or more. If the feedstock has a low content of aromatic hydrocarbons, then hydrodesulphurisation will be the predominant reaction occurring. However, if the feedstock has an appreciable content of aromatic hydrocarbons, then at least some hydrogenation of these to partially or wholly saturated hydrocarbons may also occur concurrently with hydrodesulphurisation. In this case the hydrogen consumption will be correspondingly increased. The extent of such hydrogenation of aromatic hydrocarbons will be influenced by the choice of reaction conditions and so the degree of dearomatisation of the feedstock that is achieved can be affected by the reaction conditions selected.

In the process of the invention the stoichiometric hydrogen demand may thus be a function not only of the sulphur content of the feedstock but also of the aromatics content thereof. The actual hydrogen consumption will be a function of the severity of the reaction conditions chosen, that is to say the operating temperature and pressure chosen. Thus, for example, by conditions of high severity there is meant use of a high operating pressure, a high operating temperature, or a combination of both. By and large the higher the temperature is to which the hydrocarbon feedstock is subjected during hydrodesulphurisation at a given partial pressure of hydrogen, the closer will be the extent of aromatics hydrogenation (or dearomatisation) to that corresponding to the theoretical equilibrium concentration achievable. Thus the amount of hydrogen consumed by the process of the invention does not depend solely upon the nature of the feedstock but also upon the severity of the reaction conditions used.

If the feedstock is, for example, a diesel fuel feedstock then the reaction conditions used in the process of the invention will typically be chosen to reduce the residual sulphur content to about 0.5 wt % S or less, e.g. about 0.3 wt % S or less, even down to about 0.05 wt % S or less and to reduce the aromatics content to about 27 volume % or lower, e.g. to about 20 volume % or less. If the desired product is a "technical grade" white oil, then the process conditions will be selected with a view to reducing the sulphur content to very low levels and the aromatics content as far as possible. Typically the aim will be to reduce the aromatics content sufficiently to provide a white oil which is a colourless, essentially non aromatic, mixture of paraffin and naphthenic oils which conform to the following specification:

| Saybolt colour | +20 |
|---|---|
| UV Absorbance limits | |
| Maximum absorbance | |
| per centimetre | |
| 280-289 mµ | 4.0 |
| 290-299 mµ | 3.3 |
| 300-329 mµ | 2.3 |
| 330-350 mµ | 0.8 |

If the desired end product is a medicinal grade white oil complying with the current requirements of the U.S. Department of Food and Drug Administration, then the aim is to produce a product with a maximum uv absorption per centimeter at 260-350 nm of 0.1, measured on a dimethylsulphoxide extract using the procedure laid down in the U.S. Pharmacopoeia. Other specifications require a sample to give at most a weak colouring in a hot acid test using sulphuric acid and to give no reaction in the sodium plumbite test. To meet these stringent requirements effectively all aromatic hydrocarbons present in the feedstock must be hydrogenated.

In the process of the invention there will be used in amount of hydrogen which is equivalent to at least the stoichiometric amount of hydrogen needed to desulphurise the feedstock and to achieve the desired degree of dearomatisation. Normally it will be preferred to use at least about 1.05 times such stoichiometric amount of hydrogen. In addition allowance has to be made for hydrogen dissolved in the recovered treated feedstock.

In the process of the invention the rate of supply of hydrogen-containing gas typically corresponds to an $H_2$:feedstock molar feed ratio of from about 2:1 to about 20:1; preferably this ratio is from about 3:1 to about 7:1.

The hydrogen-containing gas may be obtained in known manner, for example by steam reforming or partial oxidation of a hydrocarbon feedstock, such as natural gas, followed by conventional steps such as the water gas shift reaction, $CO_2$ removal, and pressure swing adsorption.

Different hydrodesulphurisation conditions may be used on different reaction trays. Thus, for example, the temperature on the uppermost reaction tray, which forms a first hydrodesulphurisation zone, may be lower than on the next lower tray, which in turn may be lower than the temperature on the next lower tray, and so on.

It is also envisaged that the temperature may be increased from tray to tray from the uppermost tray to an intermediate lower tray, but then the temperature is reduced from tray to tray on the succeeding lower trays. Thus it is possible to operate the process so that the temperature increases tray by tray from the uppermost tray to the intermediate tray, but then decreases from tray to tray as the liquid passes down through the column reactor. Under this regime, the feedstock will encounter progressively hotter conditions under essentially the same pressure, and progressively lower $H_2S$ partial pressures in passing down through successive reaction trays. Since the $H_2S$ partial pressure is lower on the second tray and on the lower trays than on the uppermost tray, the catalyst is effectively less sulphided and hence more active on the lower trays than on the uppermost tray. In this way the efficiency of hydrodesulphurisation is enhanced, since the conditions on the lower trays are more favourable for reaction of the remaining sulphur-containing compounds, which will tend to be the least reactive compounds, such as polycyclic sulphur-containing compounds. In addition, by reducing the temperature on the lower trays and also enhancing the catalyst activity on these trays, due to the lower $H_2S$ partial pressure on these trays, the conditions are rendered mare favourable for effecting hydrogenation of aromatic components of the feedstock, a reaction which, although promoted by an increase in hydrogen partial pressure, is equilibrium limited at high temperatures.

As the hydrogen-containing gas flowing to the uppermost tray comes from the next lower tray it will normally contain a proportion of $H_2S$. Since the make-up gas is supplied below the lowermost tray, the concentration of $H_2S$ in the gas is at its highest in the gas leaving the uppermost tray. The level of organic sulphur-containing compounds is lowest in the liquid on the lowermost tray, but these compounds are the least reactive. Whilst a sufficient $H_2S$ partial pressure should be maintained on the lowermost tray in order to keep the catalyst on that tray in a sufficiently sulphided form to obviate the danger of hydrocracking on that tray, the catalyst activity will tend to be highest on this tray so that the conditions on this tray are favourable not only for effecting hydrodesulphurisation but also for effecting hydrogenation of aromatic compounds. Hence, under suitable operating conditions, a significant reduction of the aromatic hydrocarbon content of the feedstock can be effected, while at the same time achieving efficient removal of the less readily removed sulphur-containing materials, such as cyclic and polycyclic organic sulphur compounds.

It is also envisaged that different catalysts can be used on different trays in the process of the invention. In this case a catalyst favouring hydrodesulphurisation, rather than hydrogenation of aromatic compounds, can be used an the uppermost tray or on the uppermost few trays, whilst a catalyst that has greater activity for hydrogenation of aromatic compounds is used on the lower trays.

Means may be provided for withdrawing a mixture of catalyst and liquid from one or more trays. By providing suitable valves and pumps the same withdrawal means can also be used to charge fresh catalyst to each tray, either in order to vary the quantity of catalyst in response to changes in feedstock or operating conditions or in order to replenish the catalyst charge.

It is preferred that the sulphur contents of the gas and liquid feeds to the uppermost tray are monitored to ensure that there is sufficient $H_2S$ present to maintain the catalyst in sulphided form. More often than not the feedstock will contain sufficient active sulphur-containing material or the hydrogen-containing gas fed thereto will contain sufficient $H_2S$, or both, to maintain the catalyst in sufficiently sulphided form. However if, for any reason, there should be a dangerously low level of $H_2S$ or active sulphur-containing material on the uppermost tray, then a sufficient additional amount of $H_2S$ or of an active sulphur compound, such as $CS_2$, COS, an alkyl mercaptan, a dialkyl sulphide, or a dialkyl disulphide, is added to the feedstock supplied to the uppermost tray to restore a safe level of sulphur on that tray.

Normally it will suffice to provide on the uppermost tray a sulphur concentration, in the form of $H_2S$ or of an active sulphur material, of from about 1 ppm, and preferably at least about 5 ppm up to about 1000 ppm. Typically the sulphur concentration may range from about 10 ppm upwards, e.g. from about 40 ppm up to about 100 ppm.

It is further preferred to monitor the sulphur concentration on at least one lower tray, for example the lowermost tray, and possibly on each lower tray below the uppermost tray, and to bleed into the feed to that tray, if necessary, sufficient $H_2S$ or sufficient additional active sulphur-containing material, such as $CS_2$, COS, or an alkyl mercaptan, a dialkyl sulphide, or a dialkyl disulphide, to maintain the sulphur concentration within the range of from about 1 ppm to about 1000 ppm, for example from about 5 ppm to about 100 ppm.

The liquid hydrocarbon feedstock may be, for example, selected from naphthas, kerosenes, middle distillates, vacuum gas oils, lube oil brightstocks, diesel fuels, atmospheric gas oils, light cycle oils, light fuel oils, and the like.

In the reactor used in the process of the invention the reaction trays each include a floor at least a part of which slopes at an angle equal to or greater than the angle of repose of the catalyst particles under the liquid. Thus the reaction trays may each have a floor of frustoconical shape whose slope is equal to or greater than the angle of repose of the catalyst particles under the liquid present on the trays. Alternatively the reaction trays may each have a floor and a surrounding wall, the floor including an inner floor portion which slopes downwardly and inwardly from a central portion and an outer floor portion which slopes downwardly and inwardly from the surrounding wall and the slope of the inner and outer floor portions each being equal to or greater than the angle of repose of the catalyst particles under the liquid on the tray.

The gas upcomer means associated with each reaction tray may comprise one or more bubble caps of conventional design. In a particularly preferred arrangement each such bubble cap is associated with a relatively tall riser tube, the height of which is sufficient to prevent the tray from draining the liquid in the case of temporary interruption of gas upflow for any reason. This relatively tall riser tube is covered by a corresponding inverted, relatively tall bubble cap. A non-return valve may also be fitted in such a riser tube.

If in the course of a single passage through the column reactor the desired degree of desulphurisation or dearomatisation is not achieved, then the treated material can be re-treated in a subsequent column reactor or other form of hydrodesulphurisation reactor, possibly under more severe conditions.

In order that the invention may be clearly understood and readily carried into effect a preferred process in accordance with the invention will now be described, by way of example only, with reference to the accompanying diagrammatic drawings.

Figure 1:
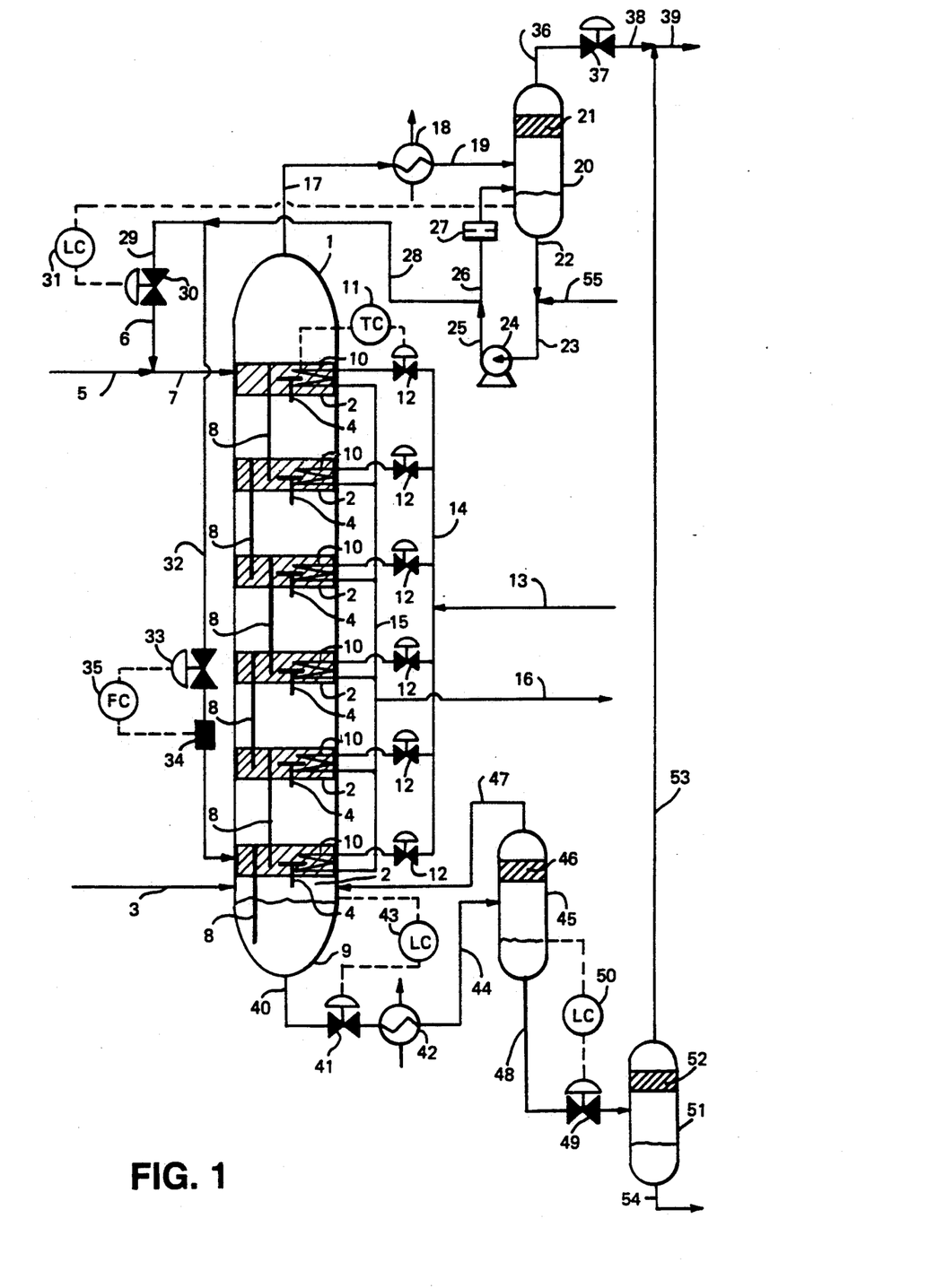
FIG. 1 is a flow diagram of a two stage hydrodesulphurisation plant designed to operate using the process of the present invention.

It will be appreciated by those skilled in the art that, as FIG. 1 is diagrammatic, further items of equipment such as heaters, coolers, temperature sensors, temperature controllers, pressure sensors, pressure relief valves, control valves, level controllers, and the like, would additionally be required in a commercial plant. The provision of such ancillary items of equipment forms no part of the present invention and would be in accordance with conventional chemical engineering practice.

Referring to FIG. 1 a hydrodesulphurisation plant includes a column reactor vessel 1 provided with a plurality of reaction trays 2 each holding a charge of a particulate sulphided hydrodesulphurisation catalyst and a predetermined volume of liquid. A hydrogen-containing gas is admitted to the reactor vessel 1 in line 3. Spargers 4 mounted in each tray 2 permit upward flow of gas through the liquid on each tray 2. A sulphur-containing hydrocarbon feedstock to be treated is supplied to the plant in line 5 and is admixed with recycled liquid in line 6 to form a mixed feed in line 7 which feeds the topmost tray 2 of reactor vessel 1. Downcomers 8 allow liquid to pass downwardly through column reactor vessel 1 from one tray 2 to the next lower tray and finally to collect in the sump 9 of column reactor 1. Further details of one of the trays 2 showing two different arrangements of the sparger 4 and the downcomer 8 are described below in relation to FIGS. 2 and 3.

It will thus be seen that gas and liquid flow in countercurrent in column reactor vessel 1.

Each tray 2 is provided with a corresponding heat exchanger coil 10. A temperature controller 11 is provided for each tray 2 and controls the action of a corresponding control valve 12, which controls the flow to the respective heat exchange coil 10 of a heat exchange medium supplied in line 13 to an inlet manifold 14. (For the sake of simplicity only one temperature controller 11 is shown in FIG. 1 for the topmost tray 2; in practice each other tray 2 has its own corresponding temperature controller 11). Reference numeral 15 indicates the return flow manifold, and reference numeral 16 the return flow line for the heat exchange medium. This arrangement enables the temperature on each tray 2 to be individually controlled.

Off-gas is recovered from the top of column reactor vessel 1 in line 17. This contains vapours of the liquid feedstock, gaseous products of the hydrodesulphurisation reaction, including $H_2S$, and inert gases contained in the feed gas in line 3. Vaporous materials are condensed in passage through condenser 18 and a two phase mixture of gas and condensate flows on in line 19 to a gas/liquid separator 20 provided with a droplet de-entrainer 21.

Condensate is withdrawn from separator 20 by way of lines 22 and 23 by pump 24 and is recirculated to separator 20 in lines 25 and 26 through flow constrictor 27 which thus creates a pressure in lines 25 and 26 that is greater than that in separator 20. Part of the liquid flowing in line 25 is returned to column reactor 1 by way of lines 28, 29 and 6 under the control of valve 30 which is in turn controlled by level controller 31 fitted to separator 20. A selected flow of liquid is diverted from line 28 via line 32 and through valve 33 and flow sensor 34 to a selected lower tray 2; in FIG. 1 it is the bottom tray 2 to which line 32 leads, but it could be a higher tray 2 than the bottom one. Flow through valve 33 is controlled by a flow controller 35 which is connected to flow sensor 34. This liquid supply via line 32 to a lower part of column reactor 1 provides a route by which reactive sulphur compounds can be supplied to the lower trays 2, thereby enabling the activity of the catalyst on the lower tray 2 to be regulated, as will be further described below.

Gas from separator 20 is purged from the plant in line 36 and passes through pressure let-down valve 37 to lines 38 and 39 by means of which it exits the plant. This off-gas contains $H_2S$ produced as a result of the hydrodesulphurisation treatment and can be subjected to further treatment (e.g. $H_2S$ removal and subsequent conversion to elemental sulphur by partial oxidation).

The liquid accumulating in sump 9 is recovered in line 40 and passes through flow control valve 41 to cooler 42. Flow controller 43 controls valve 41. The cooled liquid passes, together with desorbed hydrogen (which is less soluble in cold liquid hydrocarbons than in hot liquid hydrocarbons), by way of line 44 to gas/liquid separator 45. This is fitted with a droplet de-entrainer 46 and a gas return line 47 which leads back to the bottom of column reactor 1. The liquid collecting in separator 45 flows in line 48 through valve 49, which is under the control of level controller 50, to gas-liquid separator 51. This has a droplet de-entrainer 52 and a gas purge line 53 as well as a product recovery line 54.

Reference numeral 55 indicates a line by means of which a controlled amount of $H_2S$ or of an active sulphur-containing material, such as $CS_2$, COS, an alkyl mercaptan of formula RSE, an alkyl sulphide of formula RSR, or a dialkyl disulphide of formula RS-SR, in which R is an alkyl group such as n-butyl, can be supplied, conveniently in the form of a solution in a hydrocarbon solvent, as necessary to the hydrodesulphurisation plant as will be described further below.

In operation of the plant of FIG. 1 the liquid feedstock supplied in line 5 passes through the reactor 1 and finally exits the plant in line 54. In passage through the reactor 1 the organic sulphur compounds are largely converted to $H_2S$ some of which exits the plant in line 54 dissolved in the liquid product. Separation of $H_2S$ from the liquid product can be effected in known manner, e.g. by stripping in a downstream processing unit (not shown). Although the make-up hydrogen-containing gas in line 3 is essentially sulphur-free, the liquid flowing onto the bottom tray 2 of reactor 1 of reactor 1 will normally contain sufficient $H_2S$ to ensure that the hydrodesulphurisation catalyst thereon remains adequately sulphided and so any risk of hydrocracking reactions occurring on the bottom tray 2 of reactor 1 is minimised. On the higher trays 2 the gas feed comes from a lower tray 2 and so will contain $H_2S$ from contact with the liquid phase in that tray. Hence there will normally be a sufficient $H_2S$ partial pressure at each tray 2 of reactor 1 to ensure that its catalyst charge is adequately sulphided. If, however, for any reason the $H_2S$ partial pressure on any tray 2 of reactor 1 should fall below a safe level, then a suitable amount of a sulphur-containing material, preferably $H_2S$, $CS_2$, COS, or an active organic sulphur-containing material such as an alkyl mercaptan (e.g. n-butyl mercaptan), a dialkyl sulphide (such as di-n-butyl sulphide), or a dialkyl disulphide (e./g. di-n-butyl disulphide), is supplied, conveniently as a solution in a hydrocarbon solvent, in line 55 in order to boost the sulphur content of the feed to the respective tray 2. As $CS_2$, COS, alkyl mercaptans, dialkyl sulphides and dialkyl disulphides are readily and rapidly converted to $H_2S$, it can be ensured that the catalyst charge on each tray 2 of reactor 1 remains adequately sulphided so as to remove essentially all risk of hydrocracking occurring in reactor 1.

Figure 2:
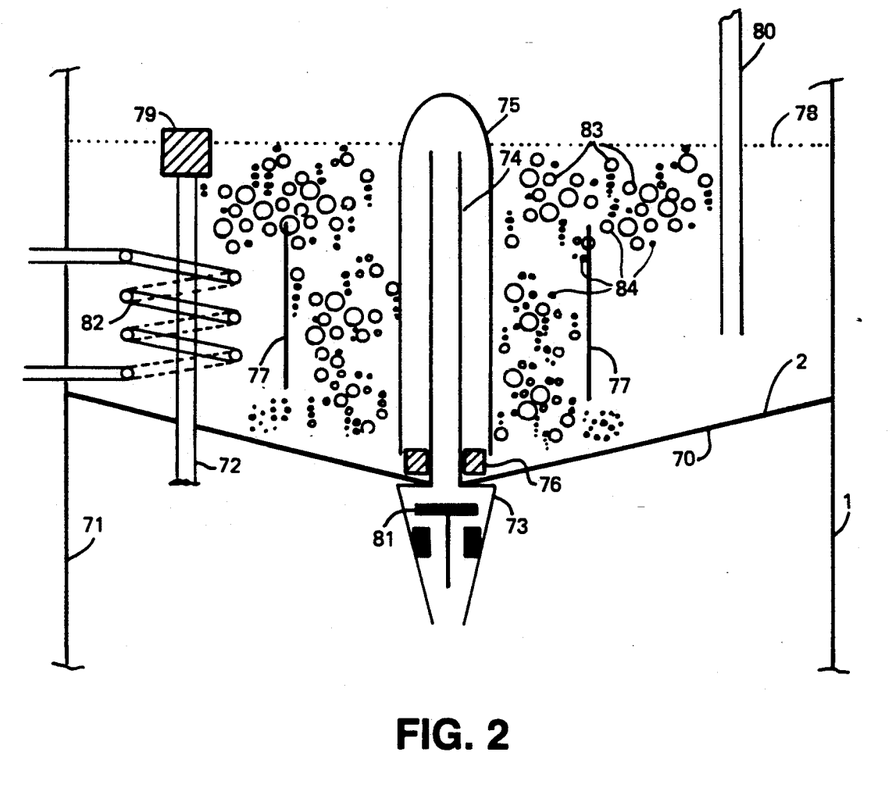
FIG. 2 is a vertical section through a tray of the column reactor of the hydrodesulphurisation plant of FIG. 1.

FIG. 2 illustrates a design of tray 2 suitable for use in a relatively small scale reactor 1. In this case a frusto-conical partition or diaphragm 70 extends within wall 71 of reactor I and closes off the cross section of reactor 1 completely except for a downcomer 72 for liquid and a gas upcomer 73. The slope of frusto-conical diaphragm 70 is equal to or greater than the angle of repose of the solid particulate hydrodesulphurisation catalyst under the liquid present on tray 2.

Gas upcomer 73 includes an axial tube 74 which is open at its upper end and which is covered by a bubble cap 75. An annular member of mesh 76 prevents catalyst particles from being sucked back within bubble cap 75. A cylindrical baffle 77 surrounds bubble cap 75 symmetrically and is positioned so as to lie beneath the liquid level 78 on tray 2, the height of which liquid level is determined by the height of the upper end of downcomer 72. A screen 79 is fitted to the top of downcomer 72 to retain catalyst particles on tray 2. Reference numeral 80 indicates the downcomer from the next higher tray 2 (not illustrated).

Baffle 77 promotes agitation of the liquid/catalyst suspension by the upcoming gas. The vertical extent of baffle 77 is not critical but should generally be between one third and three quarters of the vertical height between diaphragm 70 and liquid surface 78. It is preferred that baffle 77 should be placed in a symmetrical or near symmetrical vertical position. In the zone inside baffle 77 the liquid flow is generally upward whilst outside baffle 77 the general direction of liquid flow is downward. Preferably the area of the zone inside baffle 77 approximately equals the sum of the area outside baffle 77.

An anti-suckback valve 81 is fitted to gas upcomer 73.

The temperature of the liquid and catalyst on tray 2 can be controlled by means of heat exchanger coil 82.

In operation the upcoming gas bubbles through the liquid on tray 2 and agitates the mixture of liquid and catalyst, thus maintaining the catalyst particles in suspension. Baffle 77 assists in inducing good circulation of liquid on tray 2. At a suitable rate of gas upflow the bubbles of gas, indicated generally at 83 maintain the majority of the catalyst particles (indicated at 84) in suspension. (It will be appreciated that, in order not to complicate the drawing only a few bubbles 83 and a few catalyst particles 84 are shown).

Figure 3:
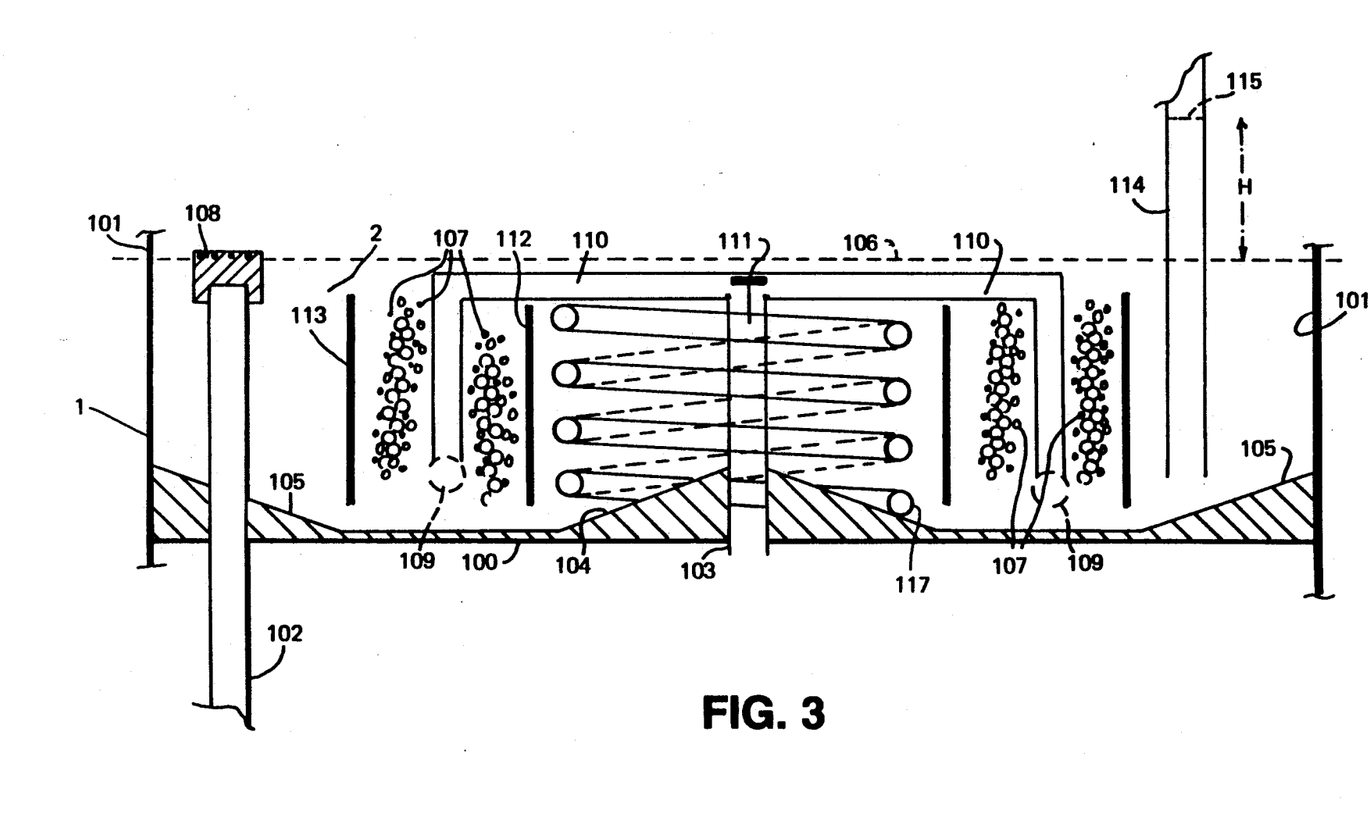
FIG. 3 is a vertical section through a tray of a modified design of a column reactor.

FIG. 3 illustrates an alternative construction of tray 2 of reactor 1 of the plant of FIG. 1. A horizontal diaphragm or partition 100 extends within wall 101 of reactor 1 and closes off the cross section of reactor 1 completely except for a downcomer 102 for liquid and a gas upcomer 103. Partition 100 has an axial frusto-conical part 104 surrounding gas upcomer 103 and an annular sloping portion 105 adjacent wall 101. Tray 2 can thus retain a volume of liquid whose surface is indicated at 106 and whose volume is determined by the height of the overflow level of downcomer 102 above the partition 100. Each tray 2 also supports a charge of a solid sulphided hydrodesulphurisation catalyst whose particles are indicated diagrammatically at 107. Such particles 107 are kept in suspension in the liquid on tray 2 as a result of agitation caused by the upcoming gas as will be described below. To prevent escape of particles 107 with the liquid overflowing down downcomer 102 the top of downcomer 102 is provided with a screen 108. The slope of frusto-conical part 104 and of sloping portion 105 is equal to or greater than the angle of repose of the solid particulate catalyst under the liquid on tray 2.

Gas upcomer 103 conducts upcoming gas to a circular sparger 109, which surrounds frusto-conical part 104, by way of spider tubes 110. Suckback of liquid down upcomer 103 is prevented by means of an anti-suckback valve 111.

Annular draught shrouds or baffles 112 and 113 are positioned within the body of liquid on tray 2, one inside and one outside circular sparger 109 to promote agitation of the liquid/catalyst suspension by the upcoming gas. The vertical extent of shrouds 112 and 113 is not critical but should generally be between one third and three quarters of the vertical height between diaphragm 100 and liquid surface 106. It is preferred that shrouds 112 and 113 should be placed in a symmetrical or near symmetrical vertical position. In the annular zone between shrouds 112 and 113 the liquid flow is generally upward whilst inside shroud 112 and outside shroud 113 the general direction of liquid flow is downward. Preferably the area of the annular zone between shrouds 112 and 113 approximately equals the sum of the areas inside shroud 112 and outside shroud 113.

Reference numeral 114 indicates a downcomer from the next tray above the one illustrated in FIG. 3. The liquid level in downcomer 114 is indicated at 115, the height H of this liquid level above liquid level 116 on tray 2 being fixed by the liquid level on the tray which feeds downcomer 114 (i.e. the tray above the illustrated tray 2) plus the pressure drop through the sparger 109 on that tray (i.e. the one above the illustrated tray 2) and the frictional pressure drop.

The temperature on tray 2 of FIG. 3 can be controlled by means of a heat exchanger coil 117.

In an alternative arrangement (not shown), heat exchanger 117 is omitted but an external heat exchanger is connected to the column reactor through which liquid drawn from tray 2 can be pumped for temperature control purposes.

The invention is further illustrated in the following Example.

EXAMPLE

Figure 4:
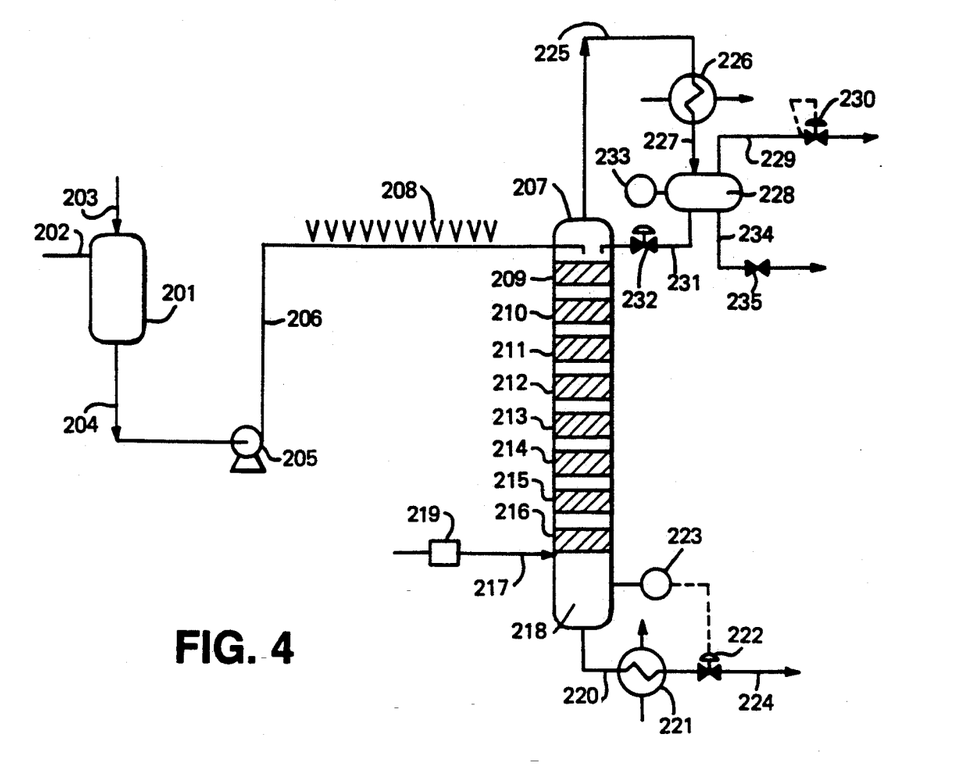
FIG. 4 is a flow diagram of an apparatus according to this invention.

The hydrodesulphurisation of a synthetic mixture of an organosulphur compound (dibenzothiophene) dissolved in a saturated hydrocarbon solvent (n-hexadecane) is studied in the apparatus shown in FIG. 4.

The liquid feedstock consists of a solution of dibenzothiophene (DBT) in normal hexadecane (114 grams of DBT per liter of solution) which is stored in a feed tank 201. The feed tank 201 is charged with previously prepared solution via line 202 and then purged with dry nitrogen via lines 202 and 203. The feed tank 201, delivery line 204, metering pump 205 and transfer line 206 are located in a circulating hot air chamber (not shown) thermostated at 50° C.+/−5° C. to avoid any risk of solid formation (since the melting point of n-hexadecane is about 20° C.). The flow of liquid to a column reactor 207 is effected by metering pump 205 and checked from time to time by a burette in the hot air chamber (also not shown). The transfer line 206 is wound with an electrical resistance heater 208 so that the feed liquid can be preheated before entering the upper part of column reactor 207. Column reactor 207 consists of a vertical metal cylinder 2.0 meters high and 7.5 cm in internal diameter containing eight reaction tray sections 209 to 216. (The construction of one of trays 209 to 216 is shown in more detail in FIG. 5 and is further described below). Hydrogen gas is supplied in line 217 to the lower part of reactor 207 (above the liquid level in its sump 218) and the desired hydrogen flow is obtained by adjustment of a mass flow controller 219.

The whole of reactor 207 is enclosed in an electrically heated forced flow circulating hot air bath (not shown).

Liquid proceeds downwards from the uppermost reaction tray 209 to lowermost reaction tray 216 by successively overflowing from one tray to the next tray below and at the same time hydrogen containing gas passes upwards through the trays 216 to 209 bubbling through the liquid on each tray. Liquid collects in sump 218 at the base of reactor 207, is discharged from the system by line 220, and is cooled by cooler 2211 through which water at approximately 45° C. is passed, under the control of valve 222 operated by level controller 223. Samples of the liquid are collected for analysis from line 224.

A gas phase leaves reactor 207 by line 225 and is cooled by condenser 226 which is supplied with water at 40° C. and the cooled gas and condensate pass via line 227 to drum 228. The gas phase then passes through line 229 and upstream pressure control valve 230 which sets the overall system operating pressure. The gas passes on to analytical flow measurement equipment and a flare (all not shown). The liquid collecting in drum 228 can be returned to tray 209 by line 231 under the control of valve 232 operated by a level sensor 233 on drum 228 or a sample can be withdrawn via line 234 and hand operated valve 235.

Figure 5:
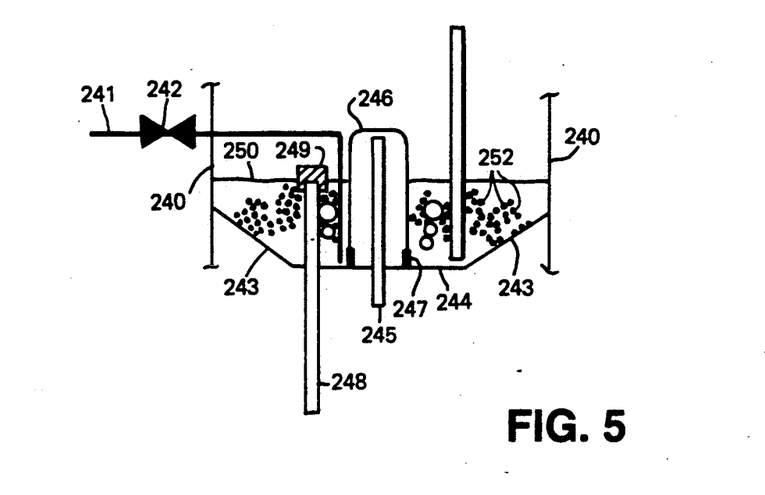
FIG. 5 is a diagram of a reaction tray of the apparatus illustrated in FIG. 4.

In example of a design for one of the reaction trays 209 to 216 is shown in FIG. 5. The vertical walls of the reactor column are shown by the numerals 240. The tray is also fitted with a charge/discharge tube 241 which is fitted with a block valve 242 used for the loading/unloading of catalyst slurry to the respective reaction tray.

The horizontal cross section of the reactor column 207 is closed by a frusto-conical diaphragm represented in vertical cross section by the numerals 243 and 244. The sloping part of the diaphragm 243 makes an angle of 30° to the horizontal. The horizontal part of the diaphragm 244 is 4 cm in diameter and is pierced by vertical tubes of 4 mm internal diameter at two locations.

Tube 245 passes through the diaphragm on the vertical axis of the reactor and projects upward into bubble cap 246 for a distance of 22 cm. The projection of tube 245 below the lower surface of horizontal portion 244 is small and can be zero. Bubble cap 246 is 20 Mm in external diameter; a 2 mm gap between the lower edge of bubble cap 246 and the upper surface of horizontal portion 244 is closed by screen material 247 consisting of fine stainless steel mesh to prevent catalyst particles entering the inner part of bubble cap 246.

Tube 248 starts at a level 9 cm above horizontal portion 244 and proceeds downward to finish in the space below portion 244. It is capped by mesh 249 in order to prevent ingress of catalyst particles. The level of the top of tube 248 determines the level of liquid 250 on the tray. The lower end of tube 248 is below the liquid level on the tray beneath (or in the case of tray 216 the lower end of tube 248 is below the liquid surface in the sump 218 of the reactor 207).

In operation the tray (i.e. one of the trays 209 to 216) receives liquid from the tray above by a tube 248 as described above (or in the case of tray 209 from the liquid feed line 206); liquid overflows through catalyst screen material 249 and passes down to the next tray below. Gas passes through tube 245, the inner part of bubble cap 246, screen 247 and bubbles through the liquid on the tray; the agitation created by the bubbles maintains catalyst particles 252 in turbulent suspension. The gas phase escaping through liquid surface 250 passes through the axial tube of the tray above (or in the case of tray 209 into line 225). In this way the liquid phase proceeds down from tray 209, to tray 210 and so on down to tray 216 and on to sump 218 and is thereby contacted countercurrently with the gas phase passing through tray 216 upwards to tray 215 and so on upwards to tray 209 and on to line 225.

After the apparatus is purged with nitrogen and the feed tank 201 is charged with the feed solution the vent line 229 is opened to the atmosphere by opening a bypass line around valve 230 (not shown).

With valve 242 open each tray 209 to 216 is charged with catalyst slurry through line 241. In this way there is charged to each of the trays 209 to 216 35 cm³ of 0.1 to 0.5 mm size range catalyst in 290 cm³ of n-hexadecane. The catalyst is sulphided CoO-MoO₃/gamma-alumina which has been previously reduced in hydrogen, cooled and immersed in n-hexadecane. 45 cm³ of n-hexadecane are used to wash any catalyst in line 241 into the tray. Valve 242 is then closed. A flow of nitrogen is established through line 217 and allowed to pass up column 207 and to vent to atmosphere via line 229. The nitrogen flow is changed to hydrogen and the apparatus is slowly pressurised to 35 bar (absolute), the column heater being used to increase the temperature from 30° C. to 325° C. over 4 hours.

As soon as the operating pressure is reached, after about 45 minutes, the hydrogen feed rate is increased to 465 liters/hr (NTP). At this point a solution of 10 g/liter of $CS_2$ in n-hexadecane is pumped into tray 216 via line 241 at 500 cm³/hr in order to ensure that the catalyst is sulphided. After 3 hours the supply of $CS_2$ solution to tray 216 is stopped and the liquid feed to tray 209 is started and established at 587 cm³/hr. During this time the liquid level in sump 218 increases and liquid then leaves the apparatus under the control of level sensor 223 and control valve 222.

The product liquid in line 224 is sampled from time to time and analysed for dibenzothiophene by gas liquid chromatography. After twelve hours of steady operation the analysis shows that 99.1% of the dibenzothiophene has been converted to sulphur free products and only non-quantifiable traces of the tetrahydro- and hexahydro-derivatives of dibenzothiophene can be seen on the chromatographic recording. During the next three days operation the dibenzothiophene conversion progressively increases to 99.5% and stabilises.

COMPARATIVE EXAMPLE

A comparative experiment in which 280 cm³ of the same catalyst in the form of 1 mm diameter extrudates 1 to 3 mm long is packed into a 25 mm internal diameter reactor to give a bed of catalyst 57 cm deep. When this conventional reactor is operated in the cocurrent gas and liquid downflow mode, using the same feed composition, and with the same temperature, pressure, and gas and liquid flow rates as are used in the Example, only 96.4% conversion of the dibenzothiophene is achieved, thus indicating a considerably poorer performance compared with the countercurrent column operation (more than seven times the amount of dibenzothiophene remaining unconverted).

The hydrogenation of aromatic compounds in the presence of a hydrodesulphurisation catalyst depends upon a number of factors, including thermodynamic and kinetic factors as well as the catalyst activity and its effectiveness.

From the point of view of thermodynamics the hydrogenation of an aromatic compound, e.g. an aromatic hydrocarbon, is an exothermic process. Moreover the extent to which the reaction will occur under particular conditions is limited by considerations such as the equilibrium at those conditions. In general the equilibrium is less favourable at high temperatures. Hence it is beneficial to operate at lower reaction temperatures, if possible.

The kinetics of the hydrogenation of aromatic hydrogenation reactions are favoured by use of high temperatures. Thus the rate of aromatics hydrogenation is increased strongly with increasing temperature, at a particular fixed hydrogen partial pressure, provided that the concentration of aromatics in the reaction mixture is above the equilibrium limit at the temperature concerned.

The capability of a given mass of catalyst of defined particle size range to perform aromatics hydrogenation is a function of the irrigation intensity applied to the catalyst particles, of the degree of sulphiding of the catalyst, and of the rates of mass transfer of $H_2$ and $H_2S$ to and away from the catalyst surface. Generally speaking, the best propensity for aromatics hydrogenation will be exhibited by a catalyst with a low degree of sulphidation which is exposed to a turbulent two phase (gas/liquid) mixed flow.

Figure 6:
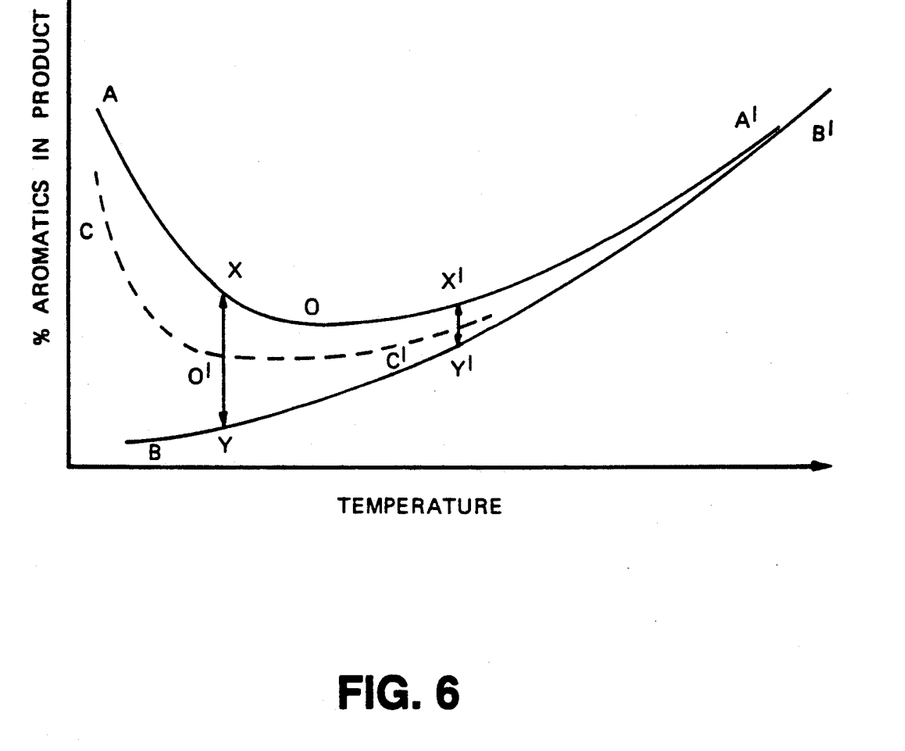
FIG. 6 is a diagram showing the relationship between the aromatics content of the product and temperature in an aromatics hydrogenation reaction.

FIG. 6 is a graph indicating diagrammatically the effect of these various factors upon an aromatics hydrogenation reaction. In FIG. 6 there is plotted percentage aromatics in the product versus temperature for a given hydrogen partial pressure. Line A—A' in FIG. 6 indicates the variation with temperature, at a fixed hydrogen partial pressure, of the kinetically limited aromatics content of the product obtained from a given feedstock with a particular aromatics content using a fixed quantity of catalyst. Line B—B' represents the equilibrium limited aromatics content in the product from the same reaction system as a function of temperature. At any given temperature the line XY (or X'Y') represents the excess aromatics content of the product and hence provides a measure of the driving force required by the catalyst. The point O represents the lowest aromatics content obtainable from the given system and is obtainable only by selecting a combination of the most favourable kinetics and the less favourable equilibrium as the temperature increases.

If the activity of the catalyst can be enhanced in some way, e.g. by controlling the degree of sulphiding thereof, then a new curve, such as C—C', can be obtained, with a new lower optimum aromatics level (point O') obtainable.

In practice crude oil derived feedstocks contain many different aromatic compounds and sulphur compounds, each with their own hydrogenation and hydrodesulphurisation kinetics. The prior removal of the less refractory materials, and the removal of the associated $H_2S$ from the sulphur compounds, that is possible using the teachings of the invention, makes it possible to achieve significant advantages using the process of the invention compared with conventional hydrodesulphurisation practices.

We claim:

1. A hydrodesulphurisation process for continuously effecting hydrodesulphurisation of a liquid sulphur-containing hydrocarbon feedstock which comprises:

(a) providing a hydrodesulphurisation zone maintained under hydrodesulphurisation conditions including use of a pressure in the range of from about 20 bar to about 150 bar and of a temperature in the range of from about 240° to about 400° C., said hydrodesulfurization zone said zone comprising a column reactor having a plurality of reaction trays therein mounted one above another, each tray defining a respective reaction stage adapted to hold a predetermined liquid volume and a charge of a particulate sulphided solid hydrodesulphurisation catalyst suspended therein, and each reaction tray having a floor at least a part of which slopes at an angle equal to or greater than the angle of repose of the catalyst particles under the liquid, said column reactor further comprising liquid downcomer means associated with each reaction tray adapted to allow liquid to pass down the column reactor from that tray but to retain solid catalyst thereon, and gas upcomer means associated with each reaction tray adapted to allow gas to enter that tray from below and to agitate the mixture of liquid and catalyst on that tray, thereby maintaining the particulate catalyst in suspension in the liquid on the tray;

(b) supplying liquid sulphur-containing hydrocarbon feedstock to the uppermost one of said plurality of reaction trays;

(c) supplying hydrogen-containing gas below the lowermost one of said plurality of reaction trays;

(d) allowing liquid to pass downward through the column reactor from tray to tray;

(e) allowing hydrogen-containing gas to pass upward through the column reactor from tray to tray;

(f) recovering from the uppermost one of said plurality of reaction trays an off-gas containing $H_2S$ produced by hydrodesulphurisation; and (g) recovering from the lowermost one of said plurality of reaction trays a liquid hydrocarbon product of reduced sulphur content.

2. A process according to claim 1, in which the solid sulphided catalyst used is selected from molybdenum disulphide, tungsten sulphide, cobalt sulphide, sulphided nickel-molybdate catalysts ($NiMoS_x$), a sulphided $CoO$-$MoO_3$/gamma-$Al_2O_3$ catalyst, and mixtures thereof.

3. A process according to claim 1, in which the reaction trays each have a floor of frusto-conical shape whose slope is equal to or greater than the angle of repose of the catalyst particles under the liquid present on the tray.

4. A process according to claim 1, in which the reaction trays each have a floor and a surrounding wall, the floor including an inner floor portion which slopes downwardly and outwardly from a central portion and an outer floor portion which slopes downwardly and inwardly from the surrounding wall and the slope of the inner and outer floor portions each being equal to or greater than the angle of repose of the catalyst particles under the liquid present on the tray.

5. A process according to claim 1, in which each reaction tray is provided with a heat exchanger for controlling the temperature of the mixture of liquid and catalyst on the reaction tray.

6. A process according to claim 1, in which the temperature of the mixture of liquid and catalyst is increased from tray to tray from the uppermost tray to an intermediate lower tray and is decreased from tray to tray on the trays succeeding said intermediate lower tray.

* * * * *

UNITED STATES PATENT AND TRADEMARK OFFICE
CERTIFICATE OF CORRECTION

PATENT NO. : 5,252,198
DATED : October 12, 1993
INVENTOR(S) : George E. Harrison et al.

It is certified that error appears in the above-indentified patent and that said Letters Patent is hereby corrected as shown below:

Col. 3, the fourth chemical combination that is being added to $8H_2$ should have no double bonds, thus, "" should be --  --; Col 4, line 47, "storage" should be -- shortage --; Col. 6, line 31, delete the dash between "gases" and "which"; Col. 11, line 20, "an" should be -- on --; Col. 13, line 65, "RSE" should be -- RSH --; Col. 17, line 1, "In" should be -- An --; Col. 17, line 19, "Mm" should be -- mm --.

Signed and Sealed this

Twenty-second Day of February, 1994

Attest:

BRUCE LEHMAN

*Attesting Officer*    *Commissioner of Patents and Trademarks*